United States Patent [19]  
Waszkiewicz

[11] Patent Number: 4,540,120  
[45] Date of Patent: Sep. 10, 1985

[54] POWDER FEED SYSTEM FOR FLAME SPRAY GUNS

[75] Inventor: Richard A. Waszkiewicz, Hicksville, N.Y.

[73] Assignee: METCO, Inc., Westbury, N.Y.

[21] Appl. No.: 513,595

[22] Filed: Jul. 14, 1983

[51] Int. Cl.³ ............................................. B05B 17/00
[52] U.S. Cl. .......................................... 239/1; 239/85;
        406/75; 406/196
[58] Field of Search .................... 239/58, 85, 79, 708,
        239/1; 406/75, 86, 191, 196, 11, 45, 134;
        366/108, 114

[56] References Cited  
U.S. PATENT DOCUMENTS 2,779,510 1/1957 Wilson et al. .......................... 406/75  
3,048,498 8/1962 Juvinall et al. ...................... 239/708  
4,026,606 5/1977 Williams .............................. 406/196  
4,094,552 6/1978 Mellor .................................. 406/86

Primary Examiner—Andres Kashnikow  
Assistant Examiner—Scott D. Malpede  
Attorney, Agent, or Firm—F. L. Masselle; E. T. Grimes; J. D. Crane

[57] ABSTRACT

A system for assuring a more even powder flow rate in a flame spray gun. A powder metering device entrains powder into a gas. The gas with entrained powder is coupled to the flame spray gun. Vibration means, coupled to the powder and gas conduit, is provided to prevent any powder from settling in the conduit.

10 Claims, 2 Drawing Figures

POWDER FEED SYSTEM FOR FLAME SPRAY GUNS

BACKGROUND OF THE INVENTION

Flame spraying involves the heat-softening or melting of a heat-fusible material, such as metal or ceramic, and the propelling or spraying of the softened material against the surface to be coated. Flame spraying is effected utilizing a flame spray gun. In certain types of guns the heat-fusible material is initially fed through the gun in powdered form. Guns which are so supplied with material to be sprayed in powdered form are known as "powder-type flame spray guns." The powdered material is generally known as a flame spray powder and is usually of a relatively small particle size, as, for example, below about 140 mesh U.S. Standard screen size. The flame spray guns utilize a combustion or plasma flame and in many guns the powder is fed to the gun or into the gun's flame entrained in a carrier gas. In order to obtain high quality coatings it is necessary to accurately control the rate of powder fed through the gun and to maintain a constant rate for given spray conditions. Powder, and particularly the fine powder of the type used as flame spray powder, has proven to be a difficult material to handle and feed in a carrier gas at the desired uniform rate.

Powder feeders such as described in U.S. Pat. Nos. 3,138,298; 3,501,097 and 3,976,332 utilize metering devices for conveying powder from a hopper into a powder feed hose at a uniform feed rate. The metering systems of different designs and modes of operation utilize gravity, mechanical and gas conveyances and combinations thereof. Typically the metering device or hopper has attached thereto a vibrator to maintain the powder in loose free-flowing form. The feed hose between the powder feed device and the flame spray gun is a flexible conduit typically of durable, fiber-reinforced plastic material to allow movement and manipulation of the flame spray gun with respect to the workpiece being coated. The manipulation of the gun may be by hand or by an automatic robot-type machine.

In spite of the precision powder feeding available from devices such as described in the above-mentioned patents, considerable variation is encountered in the actual feed rate. Pulsing and surging often occur in the powder flow at the output of the flame spray gun. This often occurs when the feeder has been turned off and back on again. Pulsing and surging also occurs during spraying.

It has been found that these difficulties are often related to settling and packing of powder in the feed hose. The feed hose generally sags in the middle, providing a low region in which powder particles that drop out of the carrier gas can accumulate. When spraying is stopped, the powder clogs the hose causing blockage. On restarting a clump of powder may issue from the gun. It is theorized that pulsing during spraying may be due to a cyclical phenomenon of powder settling out of and being re-entrained in the carrier gas in the feed hose. A similar effect is noted when the flame spray gun is moved, apparently causing a relocation of the low region of the feed hose and thereby a change in the settling of the powder.

Therefore, it is the primary objective of the present invention to provide a powder feed system for a flame spray gun which will reliably feed powder at a uniform rate without the above-mentioned difficulties.

It is a further objective of the present invention to provide a powder feed system to convey powder therethrough at a constant flow rate.

It is still a further objective of the present invention to provide a powder feed system in which powder will not disadvantageously settle.

BRIEF DESCRIPTION OF THE INVENTION

In achieving the foregoing and other objectives, advantages and features of the present invention, a flexible conduit is provided for carrying powder from a powder feeder to a flame spray gun. The conduit has a close-fitting metallic sheath such as a wire coil wrapped around it. The sheath extends from a terminus at the connection of the hose at the powder feeder to a point at a distance that is a substantial portion of the total length of the hose toward the flame spray gun connection. A vibrator is attached to the powder feeder and the vibrations therefrom are transmitted to and along the sheath causing the conduit surrounded thereby to vibrate. By vibrating the conduit, the powder therein cannot settle or pack together to form a clump.

BRIEF DESCRIPTION OF THE DRAWINGS

The drawings illustrate a powder feed system with feed hose according to the present invention wherein.

DETAILED DESCRIPTION OF THE INVENTION

Figure 1:
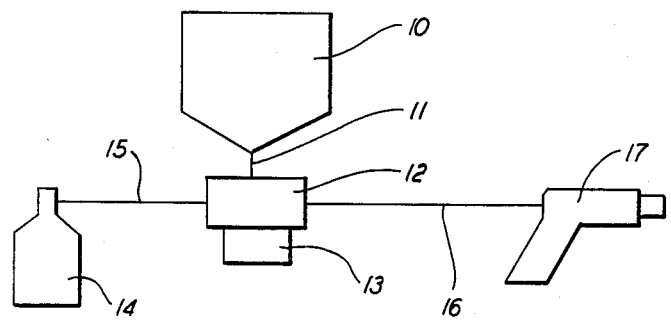
FIG. 1 is a block diagram of a powder feed system for supplying powder to a flame spray gun.

Referring now to FIG. 1, the elements of a powder feeding system of the present invention are shown schematically. Many of the elements are conventional elements such as elements described in above-mentioned patents; however, the combination has been improved in the manner hereinafter described in greater detail. A powder reservoir 10 of a conventional type contains a supply of flame spraying powder (not shown). A conduit 11 connects between the reservoir 10 and a powder metering device 12. The powder conduit 11 may be merely an orifice in a connecting structure between the reservoir and metering device or may in fact be a length of hose or the like through which powder is gravity fed. The metering device 12 has a vibrator 13 rigidly attached thereto. Powder carrier gas from a carrier gas source 14 flows through a gas conduit 15 to the metering device 12 where powder is entrained in the carrier gas at a controlled rate in a conventional manner. The entrained powder is fed through a flexible conduit 16 to a flame spray gun 17. The flexible conduit 16 is formed conventionally of durable, fiber-reinforced plastic material and has conventional inner and outer diameter dimensions, for example, 4.8 mm and 7.9 mm, respectively.

Figure 2:
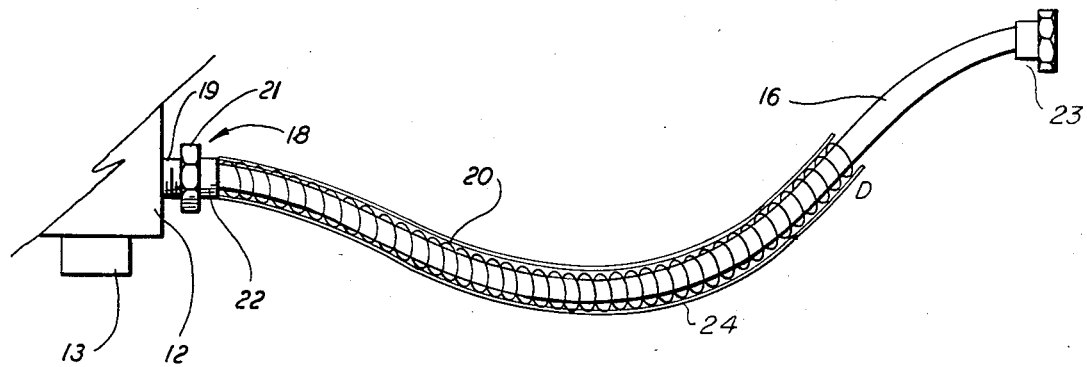
FIG. 2 shows a powder feed hose connected to a powder metering device and having a wire coil adapted thereto.

FIG. 2 shows the flexible conduit 16 according to the present invention in greater detail. The conduit 16 is attached to the metering device 12 by means of a conventional hose connector 18, preferably made of metal such as brass or steel. The hose connector 18 has a tubular member 22 which is tightly fitted to one end of the conduit 16. A female threaded portion 21 cooperates with the tubular member 22 to thread onto a male threaded coupler 19 which is mounted on the metering device thereby providing a coupling between the metering device 12 and the conduit 16.

At the opposite end of the conduit 16 is a similar coupling member 23 which is used to couple the conduit 16 to a flame spray gun (not shown).

According to the present invention, a close-fitting wire coil 20 encircles the conduit 16. One end of coil 20 is coupled to the tubular member 22 by any suitable means which allows vibrations of the tubular member 22 to be coupled to the coiled wire 20. Suitable coupling means include, but are not limited to, soldering, bolting or preferably crimping the wire. The wire coil 20 extends along the conduit 16 a substantial distance D toward the other end of the conduit where the flame spray gun (not shown) can be connected thereto. The distance D is at least to, and preferably past, the lowest point of the conduit 16 while the system is in use for flame spraying. This means that the distance D is at least half the length of conduit 16, and preferably about three fourths of the length.

The coil should be close fitting so as to assure intimate contact between the wire and the flexible conduit 16. Each loop of the coil may touch the next in a tightly formed coil, but it is not necessary for the loops to touch each other. For maintaining flexibility it is desirable that there be a gap between each successive loop, for example, equal to about from half the diameter of the flexible conduit to one diameter of the flexible conduit. The coil is encircled by a non-metallic flexible tube 24.

In operation, the vibrator 13 is turned on prior to turning on the flame spray gun 17. The vibrations from the vibrator 13 are transmitted through the metering device 12, the threaded coupler 18, the tubular member 22 to the coil 20. The vibrations are then transmitted down the length of the coil 20 thereby causing the conduit 16 to vibrate. The vibration of the conduit 16 prevents the powder therein from clumping together even when there is no gas flow therethrough. Accordingly, powder delivery is made more uniform when the spray gun 17 is turned on.

While the foregoing description has emphasized a specific system having a wire coil on the feed hose, those of specific skill may recognize that other forms of flexible metallic sheath may be used. For example, the sheath may be of the type of armored cable commonly used for flexible electrical conduit. The attachment point of the coil or other sheath may be as described or may be by a simple screw connection of an extension of the wire to another part of the powder metering device or even directly to the vibrator. The material of the sheath is denoted herein as "metallic", although the same need not be a metal, since the material should have metal-like elastic properties necessary for transmitting vibrations. A hard plastic such as acetal has such elastic properties.

An alternative embodiment might be to couple the vibrator directly to the lowest point of the flexible conduit carrying the powder and carrier gas.

The wire coil or other type of sheath may be covered with non-metallic flexible tube of plastic or the like which may serve to protect the sheath from damage, or conversely to protect proximate apparatus or material from any abrasive or other damaging effects that might result from contacting the sheath. Preferably the outer tube is loose fitting over the sheath to minimize absorption and consequent reduction of the vibrations on the sheath.

The above and other changes may be made to the system of FIGS. 1 and 2 without departing from the spirit and scope of the invention as defined in the following claims.

What is claimed is:

1. A powder feed system for flame spray gun comprising, in combination:
   a powder feeder including a powder reservoir and a powder metering device both operative to entrain a powder in a carrier gas;
   a vibrator;
   a flexible conduit for conveying said entrained powder and gas from said metering device to said gun, said conduit having a lowest point disposed between said gun and said metering device;
   means to transmit vibrations from said vibrator along said conduit at least to said lowest point of said flexible conduit to cause any non-entrained powder at said lowest point to vibrate.

2. The combination of claim 1 wherein:
   said vibrator is provided with means for rigid attachment to said powder feeder; and
   said means for transmitting vibrations comprises:
   encircling means closely encircling said flexible conduit; and
   means for coupling said encircling means to said metering device.

3. The combination of claim 2 wherein said encircling means comprises a wire coil.

4. The combination of claim 2 wherein said means for coupling comprises:
   connector means between said flexible conduit and said metering device; and
   attachment means between said encircling means and said connector means.

5. The combination of claim 3 wherein said wire coil comprises successive loops spaced apart by a distance equal to about one half of the outside diameter of said flexible conduit.

6. The combination of claim 2 wherein said encircling means extends from said means for coupling to a point at a distance greater than one half of the length of said flexible conduit.

7. The combination of claim 2 wherein said encircling means is covered by non-metallic flexible tube.

8. In powder feed system for a flame spray gun having:
   a powder reservoir and a powder metering device;
   a source of carrier gas supplied to said powder metering device;
   a vibrator rigidly attached to said powder metering device;
   a flexible conduit for conveying powder entrained in said carrier gas from said metering device to said flame spray gun; and
   a connector means between said flexible conduit and said metering device;
   the improvement comprising:
   a wire coil closely encircling the perimeter of said flexible conduit and extending from said connector means to a point at a distance greater than one half of the length of said flexible conduit; and
   attachment means between said coil and said connector means.

9. A method for supplying powder to a flame spray gun comprising:
   entraining powder in a carrier gas by means of a powder metering device;

conveying said powder and carrier gas through a flexible conduit toward a flame spray gun;

providing a close fitting coil surrounding said flexible conduit and extending from a connector between said flexible conduit and said metering device to a point greater than one half of the length of said flexible conduit; and supplying vibrations to said coil.

10. The method of claim 9 wherein:
said vibrations are supplied by a vibrator rigidly attached to said metering device; and
said coil is attached to said connector.

* * * * *